(12) United States Patent
Horiuchi

(10) Patent No.: US 7,057,828 B2
(45) Date of Patent: Jun. 6, 2006

(54) ZOOM LENS SYSTEM

(75) Inventor: Akihisa Horiuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 123 days.

(21) Appl. No.: 10/834,810

(22) Filed: Apr. 28, 2004

(65) Prior Publication Data

US 2004/0223233 A1  Nov. 11, 2004

(30) Foreign Application Priority Data

May 6, 2003  (JP) .............................. 2003-128263

(51) Int. Cl.
*G02B 15/14* (2006.01)
(52) U.S. Cl. ...................... 359/687; 359/686
(58) Field of Classification Search ................ 359/681, 359/682, 686, 687; 395/72, 77; 348/240.99, 348/240.3
See application file for complete search history.

(56) References Cited

U.S. PATENT DOCUMENTS

| | | | | |
|---|---|---|---|---|
| 4,634,236 A | * | 1/1987 | Masumoto | 359/684 |
| 4,818,083 A | * | 4/1989 | Mihara | 359/687 |
| 5,009,492 A | * | 4/1991 | Hamano | 359/684 |
| 5,940,221 A | | 8/1999 | Okayama et al. | 359/687 |
| 5,963,378 A | | 10/1999 | Tochigi et al. | 359/687 |
| 6,166,864 A | | 12/2000 | Horiuchi | 359/687 |
| 6,473,231 B1 | * | 10/2002 | Hamano et al. | 359/557 |

FOREIGN PATENT DOCUMENTS

| | | |
|---|---|---|
| JP | 07-270684 | 10/1995 |
| JP | 07-318804 | 12/1995 |
| JP | 08-292369 | 11/1996 |
| JP | 11-305124 | 11/1999 |

\* cited by examiner

*Primary Examiner*—Georgia Epps
*Assistant Examiner*—M. Hasan
(74) *Attorney, Agent, or Firm*—Morgan & Finnegan, LLP

(57) ABSTRACT

A zoom lens system is disclosed, comprising, in order from an object side to an image side, a first lens unit of positive optical power, a second lens unit of negative optical power, a third lens unit of positive optical power, and a fourth lens unit of positive optical power, wherein the second and fourth lens units are moved during zooming. The third lens unit consists of a first lens subunit of positive optical power, an aperture stop, and a second lens subunit having one or more negative lens elements and one or more positive lens elements, in order from the object to the image sides. Optical parameters including the focal length of each lens unit, lens shapes, the lens structure of each lens unit are specified to realize a zoom lens system with a smaller size of the entire lens system and higher optical performance.

27 Claims, 7 Drawing Sheets

ZOOM LENS SYSTEM

BACKGROUND OF THE INVENTION

Field of the Invention

The present invention relates to a zoom lens preferable for use in an electronic camera such as a video camera and a digital still camera, a film camera, a broadcasting camera and the like.

Recently, as enhanced functionality and a smaller size are achieved in video cameras, digital still cameras, personal digital assistants (PDAs), cellular phones, and conventional photographic cameras which use image-pickup elements, both of higher optical performance and a smaller size are needed in optical systems used in such optical apparatuses.

A known zoom lens used in such optical apparatuses has, in order from an object side, a first lens unit immovable during zooming and having a positive refractive power, a second lens unit moving for varying magnification and having a negative refractive power, a third lens unit immovable during zooming and having a positive refractive power, and a fourth lens unit moving on an optical axis for maintaining an image plane position changeable due to a variation of magnification and having a positive refractive power (for example, see Patent Documents 1 to 3).

Another known zoom lens has four lens units, that is, in order from an object side, a first lens unit having a positive refractive power, a second lens unit having an aspheric surface and a negative refractive power, a third lens unit having an aspheric surface and a positive refractive power, and a fourth lens unit having an aspheric surface and a positive refractive power. The second lens unit is moved to provide variable magnification, and the fourth lens unit is moved to correct image plane variations due to a variation of magnification and to achieve focusing (for example, see Patent Document 4).

(Patent Document 1) Japanese Patent Application Laid-Open No. H07(1995)-270684 (corresponding to U.S. Pat No. 5,963,378)

(Patent Document 2)
Japanese Patent Application Laid-Open No. H07(1995)-318804 (corresponding to U.S. Pat. No. 5,963,378)

(Patent Document 3)
Japanese Patent Application Laid-Open No. H11(1999)-305124 (corresponding to U.S. Pat. No. 6,166,864)

(Patent Document 4)
Japanese Patent Application Laid-Open No. H08(1996)-292369 (corresponding to U.S. Pat. No. 5,940,221)

In recent years, with extremely smaller pixels of image-pickup elements, a small zoom lens achieving both of high optical performance and a small overall length is desired for use in optical apparatuses such as digital cameras, video cameras, and PDAs. In addition, for higher image quality in video cameras, recording of still images is needed, and a lens system having high optical performance and a small size at the same time is required.

Generally, in a zoom lens, increasing a refractive power of each lens unit reduces an amount of movement of each lens unit for providing a predetermined zoom ratio to allow a reduction in the overall length of the lenses.

Simply increasing a refractive power of each lens unit, however, presents a problem that larger variations in aberration occur in association with zooming to cause difficulty in providing favorable optical performance over the entire zoom range. Also, exacting tolerances are needed in manufacture and thus mass production is difficult.

SUMMARY OF THE INVENTION

It is an object of the present invention to provide a zoom lens system of new structure which has a smaller size of the entire lens system and higher optical performance.

According to one aspect, the present invention provides a zoom lens system which comprises, in order from an object side to an image side, a first lens unit having a positive optical power, a second lens unit having a negative optical power, a third lens unit having a positive optical power, and a fourth lens unit having a positive optical power, wherein the second lens unit and the fourth lens unit are moved during zooming. The third lens unit of the zoom lens system consists of a first lens subunit having a positive optical power, an aperture stop, and a second lens subunit having one or more negative lens elements and one or more positive lens elements, in order from the object side to the image side. In the zoom lens system, optical parameters such as the focal length of each lens unit, lens shapes, the lens structure of each lens unit are specified to realize the aforementioned object.

DETAILED DESCRIPTION OF THE PREFERRED EMBODIMENTS

In the following, description is made for embodiments of a zoom lens system of the present invention and an image-taking apparatus using the zoom lens system as an image-taking optical system with reference to the drawings.

Figure 1:
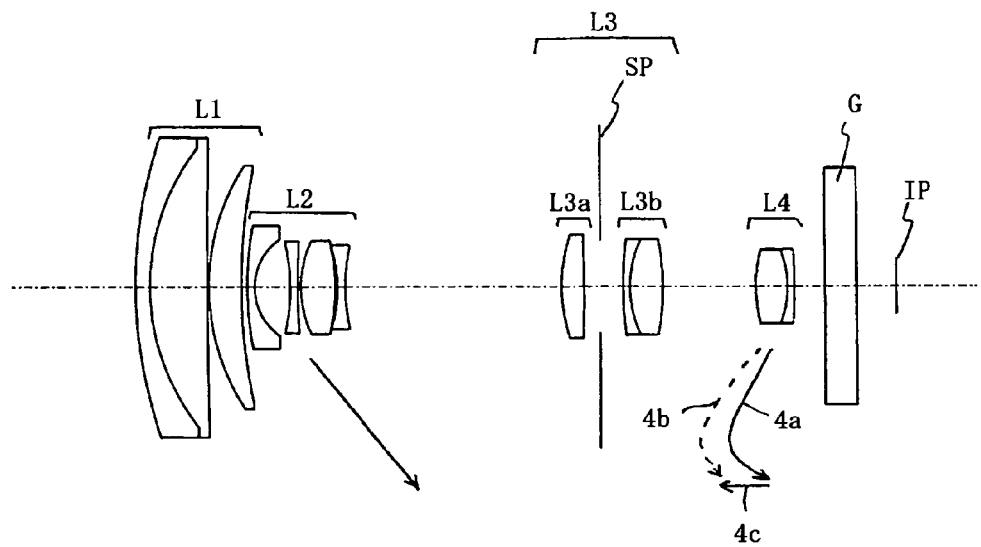
FIG. 1 is a section view of lenses of a zoom lens of Embodiment 1.
Figure 2:
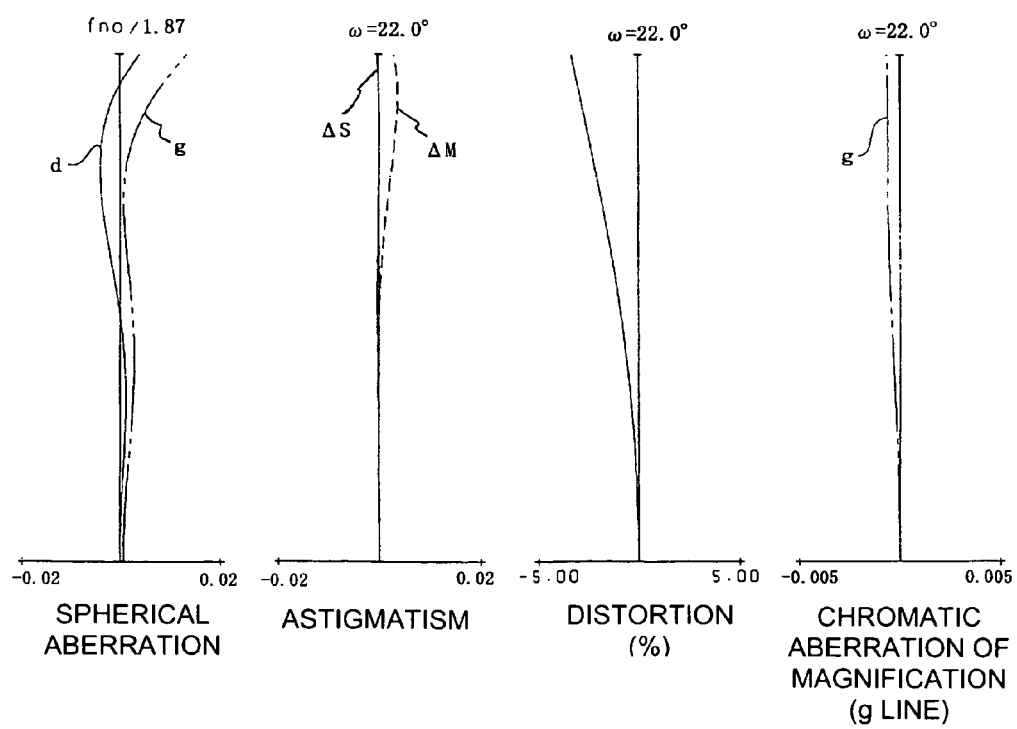
FIG. 2 shows various types of aberration in the zoom lens of Embodiment 1 at the wide-angle end.
Figure 3:
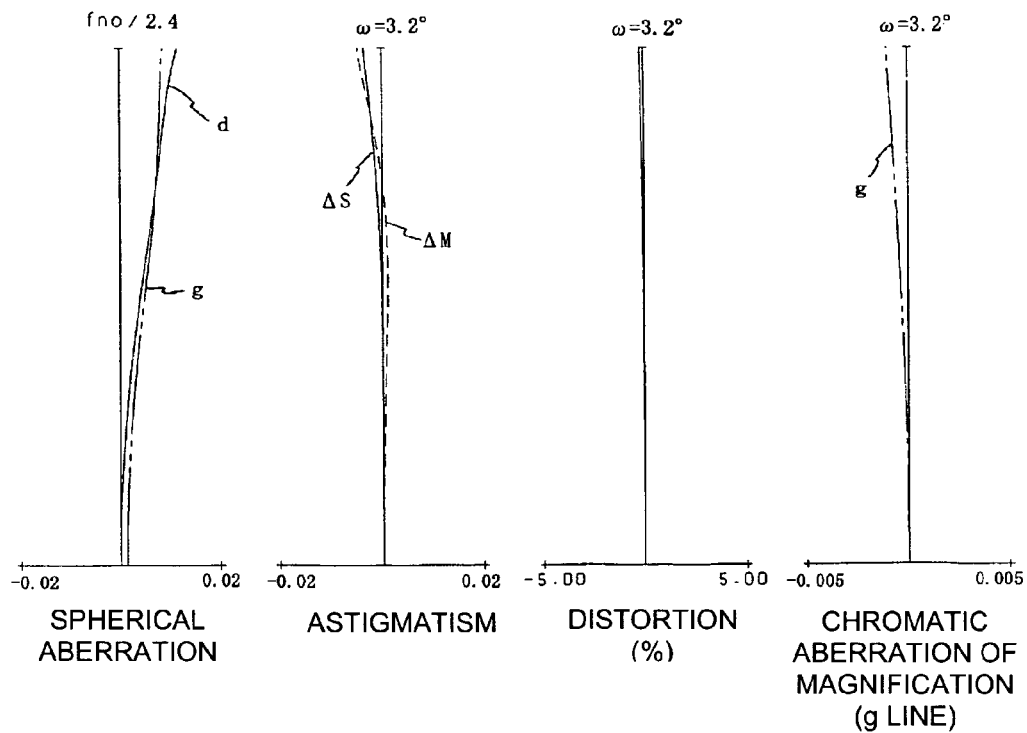
FIG. 3 shows various types of aberration in the zoom lens of Embodiment 1 at an intermediate zoom position.
Figure 4:
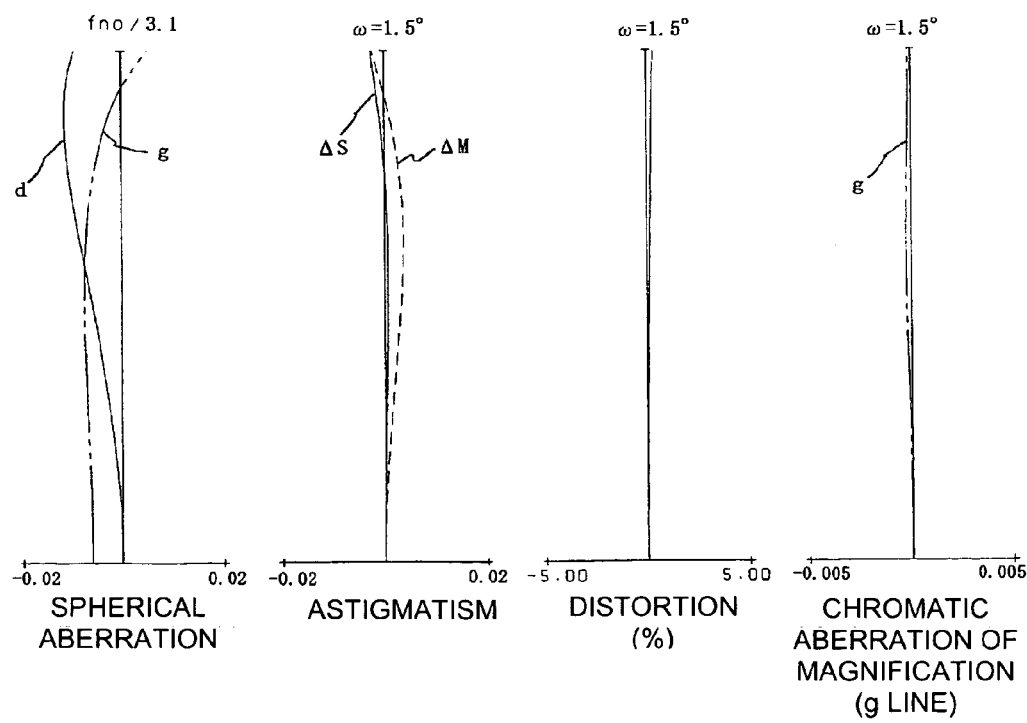
FIG. 4 shows various types of aberration in the zoom lens of Embodiment 1 at the telephoto end.

FIG. 1 is a section view of lenses of a zoom lens of Embodiment 1 at the wide-angle end. FIGS. 2 to 4 show various types of aberration in the zoom lens of Embodiment 1 at the wide-angle end, intermediate zoom position, and telephoto end, respectively.

Figure 5:
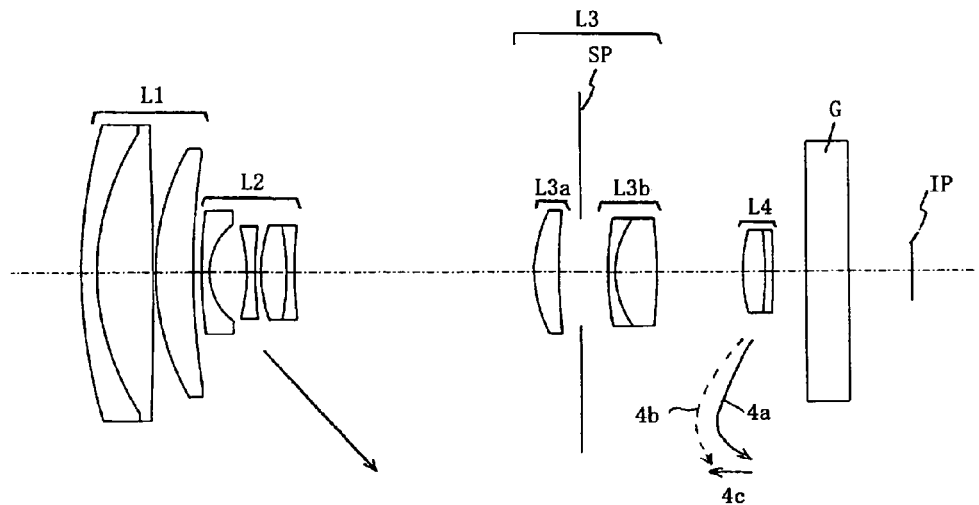
FIG. 5 is a section view of lenses of a zoom lens of Embodiment 2.
Figure 6:
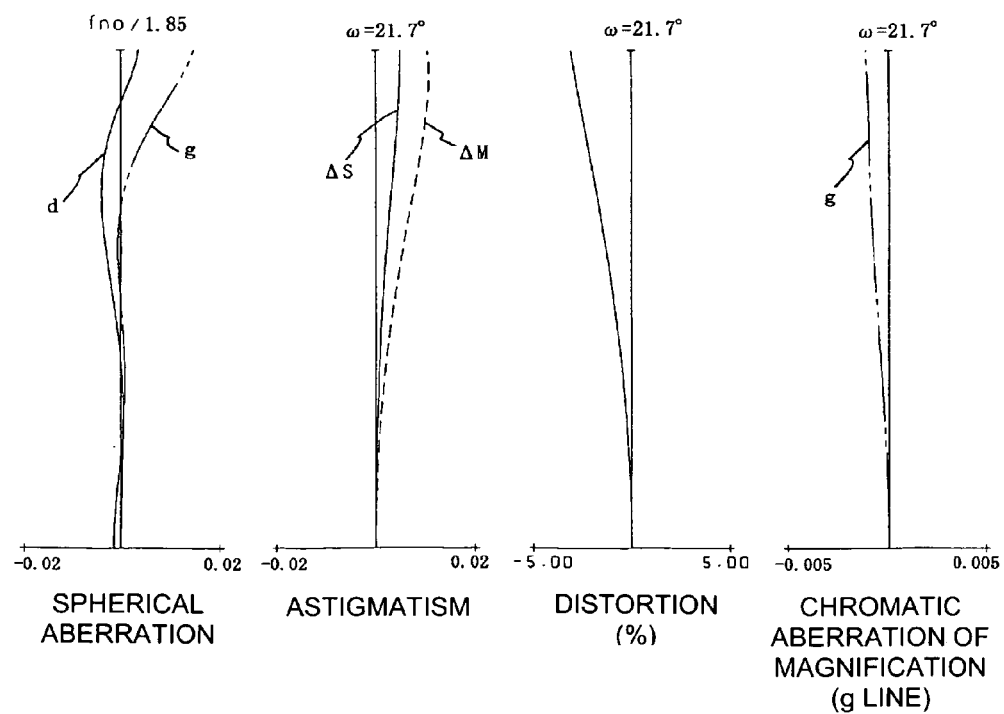
FIG. 6 shows various types of aberration in the zoom lens of Embodiment 2 at the wide-angle end.
Figure 7:
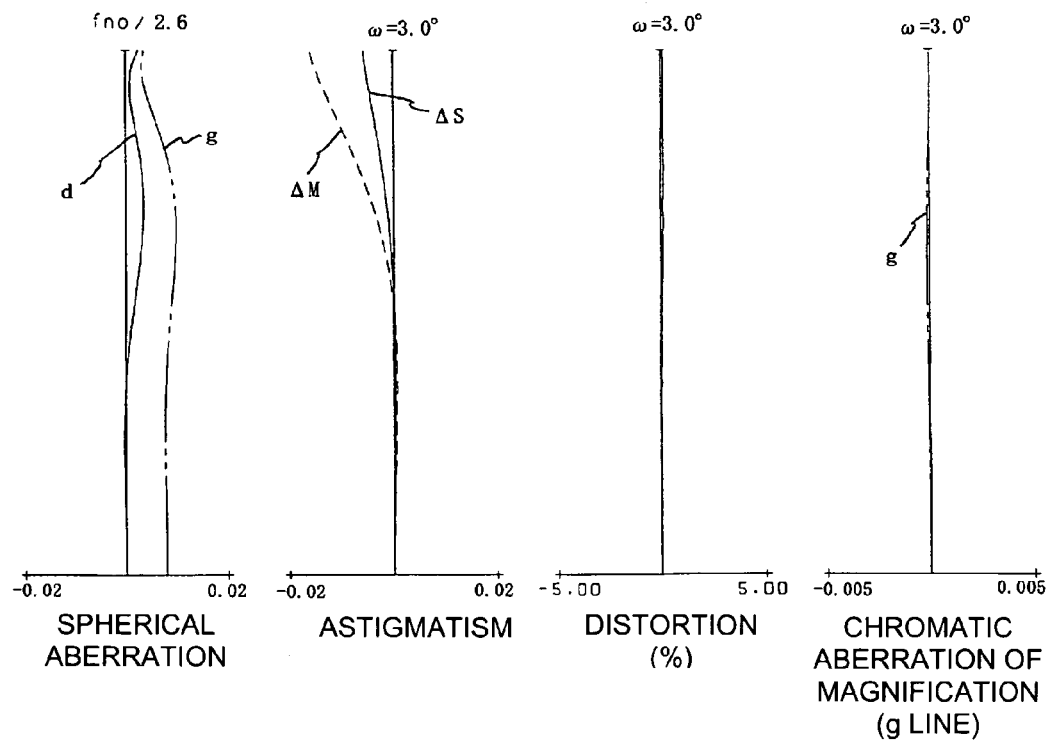
FIG. 7 shows various types of aberration in the zoom lens of Embodiment 2 at an intermediate zoom position.
Figure 8:
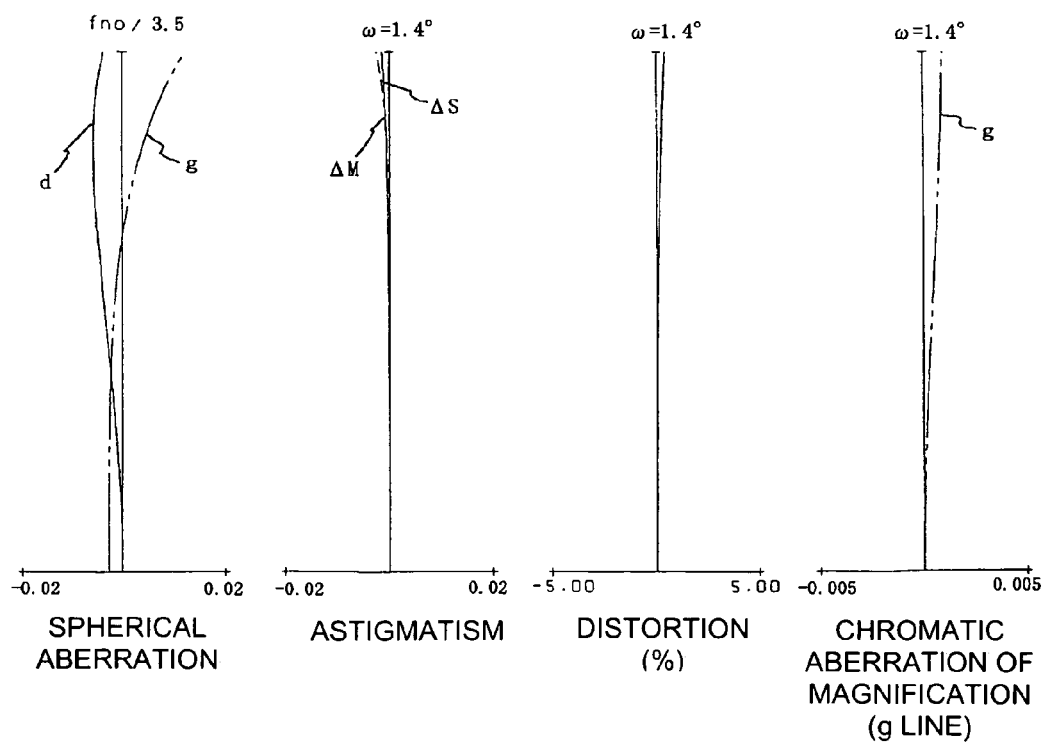
FIG. 8 shows various types of aberration in the zoom lens of Embodiment 2 at the telephoto end.

FIG. 5 is a section view of lenses of a zoom lens of Embodiment 2 at the wide-angle end. FIGS. 6 to 8 show various types of aberration in the zoom lens of Embodiment 2 at the wide-angle end, intermediate zoom position, and telephoto end, respectively.

Figure 9:
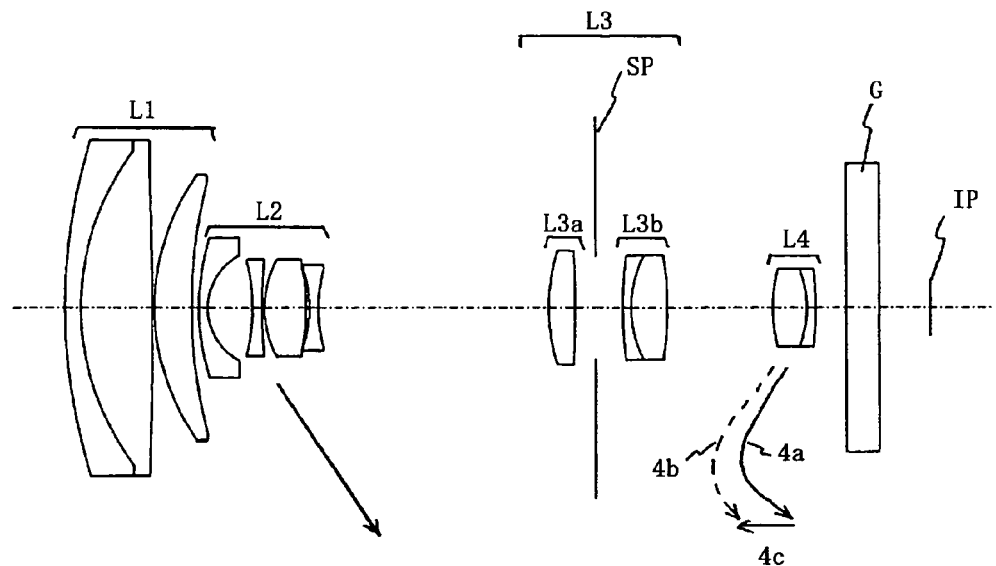
FIG. 9 is a section view of lenses of a zoom lens of Embodiment 3.
Figure 10:
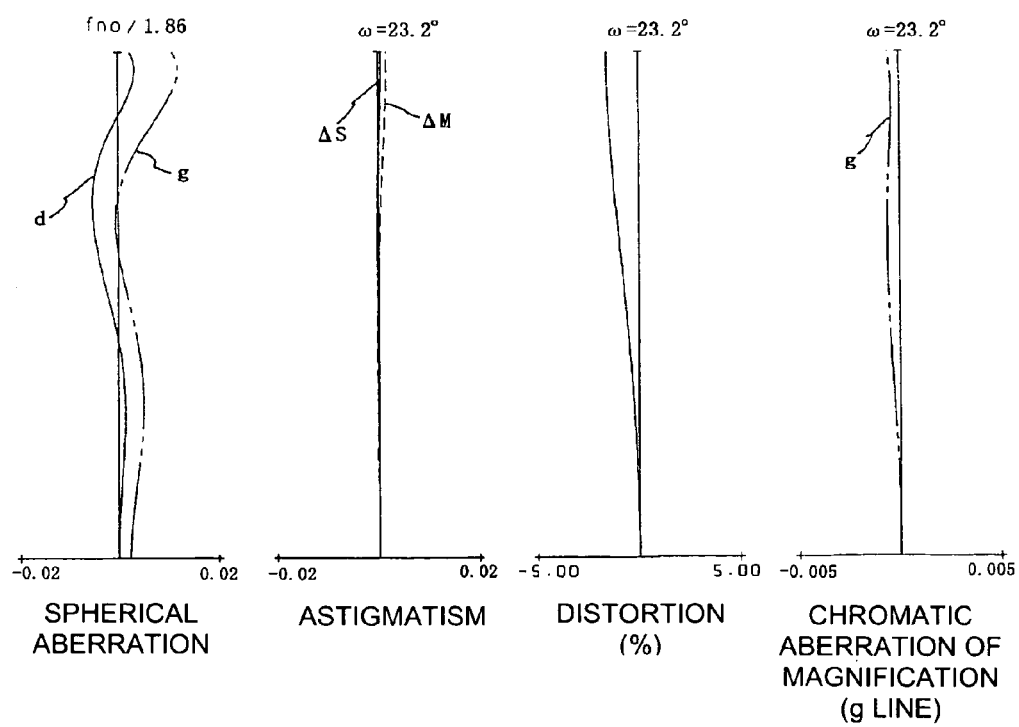
FIG. 10 shows various types of aberration in the zoom lens of Embodiment 3 at the wide-angle end.
Figure 11:
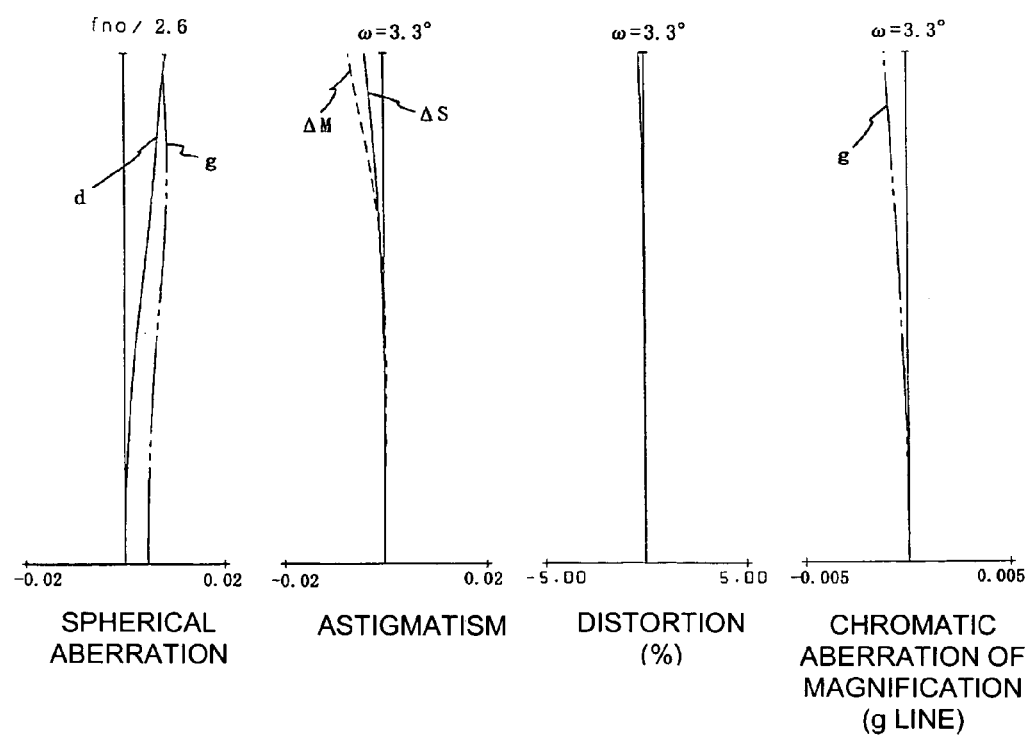
FIG. 11 shows various types of aberration in the zoom lens of Embodiment 3 at an intermediate zoom position.
Figure 12:
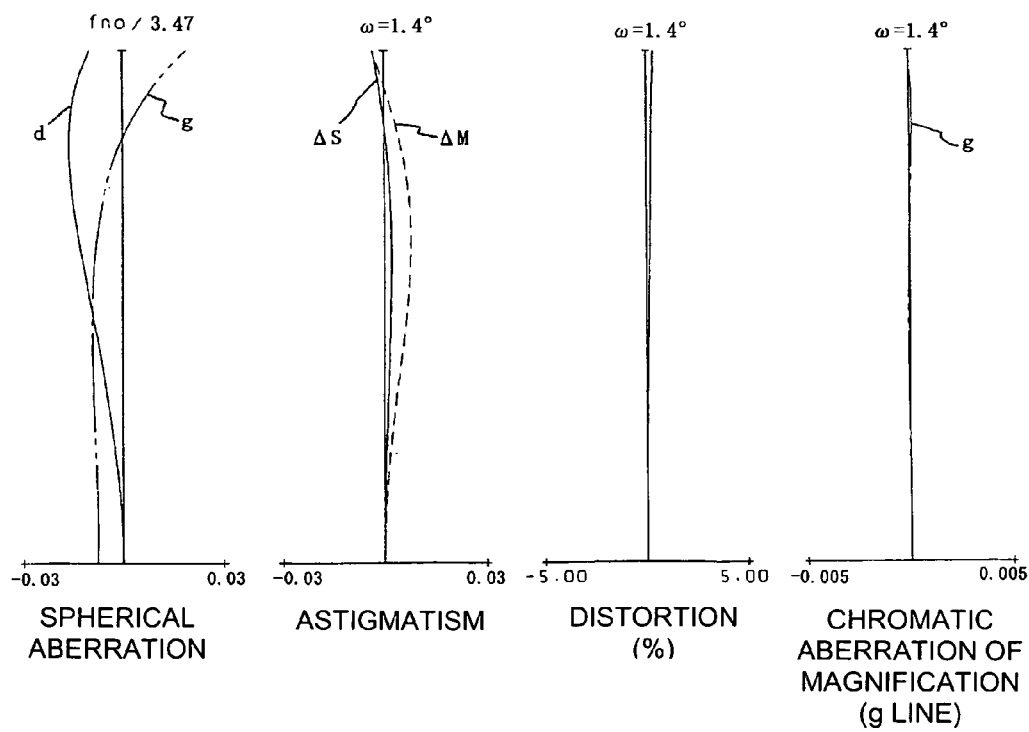
FIG. 12 shows various types of aberration in the zoom lens of Embodiment 3 at the telephoto end.

FIG. 9 is a section view of lenses of a zoom lens of Embodiment 3 at the wide-angle end. FIGS. 10 to 12 show various types of aberration in the zoom lens of Embodiment 3 at the wide-angle end, intermediate zoom position, and telephoto end, respectively.

In each of the section views of the lenses of FIGS. 1, 5, and 9, L1 shows a first lens unit having a positive refractive power (that is, an optical power which is the reciprocal of a focal length), L2 shows a second lens unit having a negative refractive power, and L3 shows a third lens unit having a positive refractive power. The third lens unit L3 has a first lens subunit L3a having a positive refractive power and a second lens subunit L3b having a positive refractive power. L4 shows a fourth lens unit having a positive refractive power. SP shows an aperture stop which is disposed between the first lens subunit L3a and the second lens subunit L3b. G shows a glass block provided in design and corresponding to a color splitting prism, a face plate, or various optical filters. IP shows an image plane at which a solid-state image-pickup element such as a CCD sensor and a CMOS sensor is located.

In the aberration diagrams of FIGS. 2 to 4, FIGS. 6 to 8, and FIGS. 10 to 12, d and g show a d-line and a g-line, respectively. ΔM and ΔS show a meridional image plane and a sagittal image plane, respectively. The chromatic aberration of magnification is represented by the g-line. In addition, fno represents an F number, and ω represents half of the field angle.

In each of the zoom lenses of Embodiments 1 to 3, the second lens unit L2 is moved toward the image side to provide variable magnification as shown by an arrow during zooming from the wide-angle end to the telephoto end. In addition, the fourth lens unit L4 is moved to have part of a convex track toward the object side to correct image plane variations associated with variations of magnification.

The zoom lenses of Embodiments 1 to 3 employ a rear focusing scheme in which the fourth lens unit L4 is moved on an optical axis to achieve focusing. For example, to achieve focusing on an object at a short distance from an object at infinity at the telephoto end, the fourth lens unit L4 is moved forward as shown by a line 4c in each of FIGS. 1, 5, and 9. A solid curve line 4a and a dotted curve line 4b showing tracks of movement of the fourth lens unit L4 in each of FIGS. 1, 5, and 9 represent tracks of movement thereof for correcting image plane variations associated with variations of magnification from the wide-angle end to the telephoto end when the zoom lens is focused on an object at infinity and an object at a short distance, respectively. The fourth lens unit L4 is moved to have part of the convex track toward the object side to effectively use the space between the third lens unit L3 and the fourth lens unit L4 to advantageously achieve a reduction in the overall length of the zoom lens system. The movement track of the fourth lens unit L4 depends on an object distance.

It should be noted that, while the first lens unit L1 and the third lens unit L3 are not moved during zooming and focusing in each of the zoom lenses of Embodiments 1 to 3, they may be moved as required.

Next, specific characteristics of the zoom lens systems of Embodiments 1 to 3 are described.

The following conditional expression is satisfied:

$$0.05 < |f2/ft| < 0.081 \quad (1)$$

where ft represents a focal length of the entire system at the telephoto end, and f2 represents a focal length of the second lens unit L2.

The conditional expression (1) is provided for the following reasons. When a reduced size of the entire lens system is intended in the zoom type lens of the aforementioned structure, it is necessary to reduce the focal length of the second lens unit L2. Simply reducing the focal length, however, places a significant burden of the refractive power on the second lens unit L2 to cause difficulty in maintaining favorable optical performance. On the other hand, when the focal length at the telephoto end is large, aberration of the second lens unit L2 at the telephoto end has a great influence. Thus, the focal length (the refractive power) of the second lens unit L2 is set to the range defined by the conditional expression (1) as above to satisfactorily correct off-axis optical performance, especially flare.

More preferably, the numerical range of the conditional expression (1) may be set as follows:

$$0.06 < |f2/ft| < 0.078 \quad (1a)$$

In addition, one or more of the following conditional expressions are satisfied:

$$0.34 < f1/ft < 0.57 \quad (2)$$

$$0.22 < |f2/fA| < 0.34 \quad (3)$$

$$0.74 < f3/f4 < 1.2 \quad (4)$$

$$0.48 < |\beta 4t| < 0.71 \quad (5)$$

where fw and ft represent focal lengths of the entire system at the wide angle end and the telephoto end, respectively, fi represents a focal length of an i-th lens unit, β4t represents an image-forming magnification of the fourth lens unit L4 when the zoom lens is focused on an object at infinity at the telephoto end, and fA is represented by:

$$fA = \sqrt{fw \cdot ft}$$

It should be noted that the wide-angle end and the telephoto end refer to zoom positions when a lens unit for variable magnification (the second lens unit L2 in Embodiments 1 to 3) is positioned at two ends of a mechanically movable range on an optical axis.

The conditional expressions (2) to (5) are provided mainly for reducing the overall length of the zoom lens system and maintaining favorable optical performance.

The conditional expression (2) is provided for setting a proper focal length of the first lens unit L1. The first lens unit L1 has a great influence on aberration on the telephoto end side. Thus, if the focal length of the first lens unit L1 is so large as to result in the value of f1/ft larger than the upper limit of the conditional expression (1), the focal length of the entire lens system is large to cause difficulty in ensuring a desired focal length. On the other hand, a small value of f1/ft less than the lower limit of the conditional expression (1) is not preferable since the first lens unit L1 is heavily burdened to prevent achievement of favorable optical performance, especially spherical aberration and chromatic aberration at the telephoto end.

The conditional expression (3) is provided for setting a proper focal length of the second lens unit L2 (in other words, a power which is the reciprocal of the focal length). A larger focal length of the second lens unit L2 which results in the value of |f2/fA| than the upper limit of the conditional expression (3) is preferable in correcting aberration, but is not preferable since the amount of movement of the second lens unit L2 must be increased in order to provide a desired zoom ratio, leading to an increased size of the entire lens system. On the other hand, if the lower limit is not reached, the Petzval sum becomes a negative large number to incline the image plane, thereby making it difficult to maintain satisfactory optical performance.

The conditional expression (4) relates to optimal distribution of refractive powers to reduce the size of the third lens unit L3 and the fourth lens unit L4 which form an image-forming system. Especially, the conditional expression (4) is provided for causing a luminous flux emerging from the third lens unit L3 to be incident on the fourth lens unit L4 substantially in an afocal manner and for ensuring an optimal back focal distance when an optimal spacing is set between the third lens unit L3 and the fourth lens unit L4.

If a value of f3/f4 exceeds the upper limit of the conditional expression (4), the luminous flux emerging from the third lens unit L3 deviates from the afocal state to increase the size of the fourth lens unit L4. In addition, variations in aberration are disadvantageously increased in association with the movement of the fourth lens unit L4. On the other hand, if the lower limit is not reached, the refractive power of the fourth lens unit L4 is low to increase the amount of movement of the fourth lens unit L4 for focusing to result in an increased overall length of the zoom lens system.

The conditional expression (5) is provided for reducing the distances from the third lens unit L3 to the fourth lens unit L4, which form the image-forming system, and the image plane. If a value of |β4t| exceeds the upper limit of the conditional expression (5), the back focal distance is extremely small to interfere with a filter member such as an optical low pass filter and an infrared cut filter or the solid-state image-pickup element disposed on the image plane. On the other hand, a small value of |β4t| less than the lower limit of the conditional expression (5) is not preferable since the back focal distance is extremely large to increase the overall length of the zoom lens system.

More preferably, the numerical ranges of the conditional expressions (2) to (5) may be set as follows:

$$0.36 < f1/ft < 0.50 \quad (2a)$$

$$0.24 < |f2/fA| < 0.32 \quad (3a)$$

$$0.80 < f3/f4 < 1.0 \quad (4a)$$

$$0.485 < |β4t| < 0.65 \quad (5a)$$

The second lens subunit L3b has a lens surface closest to the image side which is a convex surface toward the image side (a convex shape), and the following conditional expression is satisfied:

$$0.99 < |R3bL/f3| < 12.5 \quad (6)$$

where R3bL represents the radius of curvature of the convex surface of the second lens subunit L3b, and f3 represents a focal length of the third lens unit L3.

The conditional expression (6) is provided for limiting the shape of the lens surface closest to the image side of the second lens subunit L3b, in which the lens surface is formed in the convex shape toward the image side and the radius of curvature thereof is limited. When the zoom lens of each of Embodiments 1 to 3 is applied to an image-taking apparatus using a solid-state image-pickup element on an image plane, the reflectivity is relatively high on the surface of the solid-state image-pickup element and this often causes ghosts or flare. Forming the lens surface in the convex shape can diverge reflected light from the solid-state image-pickup element to reduce the amount of light incident on the image plane. In addition, spherical aberration on the wide-angle end side can be more favorably corrected by satisfying the conditional expression (6).

More preferably, the numerical range of the conditional expression (6) may be set as follows:

$$1.2 < |R3bL/f3| < 9.2 \quad (6a)$$

The second lens unit L2 is formed of three or more negative lenses and one or more positive lenses. The third lens unit L3 is formed of the first lens subunit L3a having the positive refractive power, the aperture stop, and the second lens subunit L3b having one or more negative lenses and one or more positive lenses, in order from the object side.

In each of Embodiments 1 to 3, since the structure of the lenses of the second lens unit L2 which largely contributes to variable magnification is set as described above, the Petzval sum can be maintained at a satisfactory value even when the power is increased (the focal length is reduced), thereby achieving excellent optical performance.

In addition, an aspheric surface provided in the second lens unit L2 can increase the power to reduce the size of the entire lens system while favorable performance is maintained.

The first lens subunit L3a has a positive lens having an aspheric surface, and the second lens subunit L3b has a negative lens having a concave surface toward the image side and a positive lens having convex lens surfaces on both sides. This favorably prevents undercorrection of curvature of field at the wide-angle end by using the aspheric surface.

The fourth lens unit L4 is moved to achieve focusing.

In each of Embodiments 1 to 3, the rear focusing scheme with the fourth lens unit L4 is employed to reduce the size of the entire lens system, allow quick focusing, and facilitate taking close-ups.

All or some lenses of the third lens unit L3 are moved to have a component perpendicular to the optical axis to move an image, thereby correcting an image blur caused when the zoom lens vibrates. When vibration isolation is performed in the zoom lens by parallel or rotationally decentering some lenses of the image-taking system to have a component perpendicular to the optical axis, an extra optical system is not required for preventing a displacement of a taken image and the vibration isolation is easily performed.

According to each of Embodiments 1 to 3 as described above, a zoom lens system can be achieved with a smaller size of the entire lens system and higher optical performance even at a high zoom ratio.

In addition, it is possible to realize a zoom lens which has excellent optical performance over the entire zoom range from the wide-angle end to the telephoto end even at a high zoom ratio of 14 or more and over the entire object distance from an object at infinity to an object at an extremely short distance, and which has a small number of constituent lenses even with a large aperture ratio at an F number of approximately 1.8.

Next, numeric data of Numerical Examples 1 to 3 corresponding to Embodiments 1 to 3 is shown. In each of Numerical Examples 1 to 3, i represents the order of an optical surface from the object side, Ri represents the radius of curvature of an i-th optical surface (an i-th surface), Di represents a distance between an i-th surface and an i+1-th surface, Ni and vi represent the refractive index and the Abbe number of the material of an i-th optical member for the d-line. Two planes closest to the image side are the surfaces of the glass block G. In addition, f represents a focal length, Fno represents an F number, and ω represents half of the field angle. An aspheric shape is represented by:

$$x = \frac{(1/R)h^2}{1+\sqrt{\{1-(1+k)(h/R)^2\}}} + Bh^4 + Ch^6 + Dh^8 + Eh^{10} + Fh^{12}$$

where k represents the conic constant, B, C, D, E, and F represent aspheric coefficients of the order 4, 6, 8, 10, and 12, respectively, x represents a displacement in the optical axis direction at a height h from the optical axis relative to the surface vertex, and R represents a radius of curvature. Furthermore, "e-0X" means "×10$^{-X}$". Table 1 shows numerical values calculated with the aforementioned conditional expressions in the respective Numerical Examples.

NUMERICAL EXAMPLE 1

| f = 1~15.81 Fno = 1.87~3.08 2ω = 44.1~2.9 | | | |
|---|---|---|---|
| R1 = 10.150 | D1 = 0.28 | N1 = 1.846660 | ν1 = 23.9 |
| R2 = 4.857 | D2 = 1.16 | N2 = 1.696797 | ν2 = 55.5 |
| R3 = 112.565 | D3 = 0.04 | | |
| R4 = 4.836 | D4 = 0.65 | N3 = 1.772499 | ν3 = 49.6 |
| R5 = 12.649 | D5 = Variable | | |
| R6 = 7.425 | D6 = 0.14 | N4 = 1.882997 | ν4 = 40.8 |
| R7 = 1.250 | D7 = 0.72 | | |
| R8 = −4.043 | D8 = 0.14 | N5 = 1.882997 | ν5 = 40.8 |
| R9 = 17.697 | D9 = 0.06 | | |
| R10 = 2.258 | D10 = 0.70 | N6 = 1.846660 | ν6 = 23.9 |
| R11 = −4.055 | D11 = 0.05 | | |
| R12 = −2.965 | D12 = 0.14 | N7 = 1.785896 | ν7 = 44.2 |
| R13 = 3.650 | D13 = Variable | | |
| R14‡ = 3.370 | D14 = 0.46 | N8 = 1.740130 | ν8 = 49.2 |
| R15 = −48.641 | D15 = 0.34 | | |
| R16 = Aperture Stop | D16 = 0.46 | | |
| R17 = 7.898 | D17 = 0.14 | N9 = 1.846660 | ν9 = 23.9 |
| R18 = 2.350 | D18 = 0.65 | N10 = 1.516330 | ν10 = 64.1 |
| R19 = −5.433 | D19 = Variable | | |
| R20 = 3.400 | D20 = 0.63 | N11 = 1.696797 | ν11 = 55.5 |
| R21 = −2.112 | D21 = 0.14 | N12 = 1.834000 | ν12 = 37.2 |
| R22 = −9.719 | D22 = Variable | | |
| R23 = ∞ | D23 = 0.65 | N13 = 1.516330 | ν13 = 64.1 |
| R24 = ∞ | | | |

| | Focal Length | | |
|---|---|---|---|
| Variable Spacing | 1.00 | 7.18 | 15.81 |
| D5 | 0.12 | 3.60 | 4.26 |
| D13 | 4.34 | 0.86 | 0.20 |
| D19 | 1.84 | 0.69 | 2.24 |
| D22 | 0.60 | 1.75 | 0.20 |

*denotes an aspheric surface.
Aspheric Coefficient
R14 k=−3.46987e+00 B=4.52418e−03 C=−1.16451e−03 D=4.19744e−03 E=−5.48293e−03 F=2.10828e−03

NUMERICAL EXAMPLE 2

| f = 1~15.79 Fno = 1.85~3.49 2ω = 43.3~2.9 | | | |
|---|---|---|---|
| R1 = 10.171 | D1 = 0.28 | N1 = 1.846660 | ν1 = 23.9 |
| R2 = 4.985 | D2 = 1.00 | N2 = 1.603112 | ν2 = 60.6 |
| R3 = −82.248 | D3 = 0.05 | | |
| R4 = 4.772 | D4 = 0.69 | N3 = 1.772499 | ν3 = 49.6 |
| R5 = 13.859 | D5 = Variable | | |
| R6 = 9.431 | D6 = 0.14 | N4 = 1.834807 | ν4 = 42.7 |
| R7 = 1.159 | D7 = 0.69 | | |
| R8 = −3.129 | D8 = 0.14 | N5 = 1.804000 | ν5 = 46.6 |
| R9 = 7.280 | D9 = 0.10 | | |
| R10 = 2.761 | D10 = 0.47 | N6 = 1.846660 | ν6 = 23.9 |
| R11 = −4.744 | D11 = 0.00 | N7 = 1.846660 | ν7 = 23.9 |
| R12 = −4.744 | D12 = 0.13 | N8 = 1.834807 | ν8 = 42.7 |
| R13 = 8.175 | D13 = Variable | | |
| R14‡ = 2.435 | D14 = 0.46 | N9 = 1.730770 | ν9 = 40.5 |
| R15 = 13.215 | D15 = 0.39 | | |
| R16 = Aperture Stop | D16 = 0.51 | | |
| R17 = 6.152 | D17 = 0.13 | N10 = 1.846660 | ν10 = 23.9 |
| R18 = 1.731 | D18 = 0.75 | N11 = 1.516330 | ν11 = 58.3 |
| R19 = −9.116 | D19 = Variable | | |
| R20‡ = 2.939 | D20 = 0.40 | N12 = 1.693500 | ν12 = 53.2 |
| R21 = −6.942 | D21 = 0.13 | N13 = 1.846660 | ν13 = 23.9 |
| R22 = −34.816 | D22 = Variable | | |
| R23 = ∞ | D23 = 0.76 | N14 = 1.516330 | ν14 = 64.1 |
| R24 = ∞ | | | |

| | Focal Length | | |
|---|---|---|---|
| Variable Spacing | 1.00 | 7.47 | 15.79 |
| D5 | 0.12 | 3.65 | 4.32 |
| D13 | 4.36 | 0.84 | 0.16 |
| D19 | 1.57 | 0.39 | 1.95 |
| D22 | 0.59 | 1.77 | 0.21 |

*denotes an aspheric surface.
Aspheric Coefficient
R14 k=−1.57942e+00 B=5.38617e−03 C=9.16238e−04 D=2.66834e−04 E=−1.30429e−03 F=6.04124e−04
R20 k=−4.09278e+00 B=1.65647e−02 C=−9.09464e−03 D=6.17476e−03 E=1.41630e−02 F=−2.18714e−02

NUMERICAL EXAMPLE 3

| f = 1~17.80 Fno = 1.86~3.47 2ω = 46.4~2.8 | | | |
|---|---|---|---|
| R1 = 11.168 | D1 = 0.30 | N1 = 1.846660 | ν1 = 23.9 |
| R2 = 5.083 | D2 = 1.34 | N2 = 1.696797 | ν2 = 55.5 |
| R3 = −119.329 | D3 = 0.04 | | |
| R4 = 4.577 | D4 = 0.68 | N3 = 1.772499 | ν3 = 49.6 |
| R5 = 10.200 | D5 = Variable | | |
| R6 = 4.705 | D6 = 0.16 | N4 = 1.882997 | ν4 = 40.8 |
| R7 = 1.181 | D7 = 0.83 | | |
| R8 = −3.965 | D8 = 0.16 | N5 = 1.882997 | ν5 = 40.8 |
| R9 = 10.242 | D9 = 0.05 | | |
| R10 = 2.045 | D10 = 0.77 | N6 = 1.846660 | ν6 = 23.9 |
| R11 = −4.085 | D11 = 0.05 | | |
| R12 = −2.707 | D12 = 0.16 | N7 = 1.785896 | ν7 = 44.2 |
| R13 = 3.168 | D13 = Variable | | |

-continued f = 1~17.80 Fno = 1.86~3.47 2ω = 46.4~2.8

| | | | |
|---|---|---|---|
| R14‡ = 3.657 | D14 = 0.50 | N8 = 1.740130 | ν8 = 49.3 |
| R15 = −19.481 | D15 = 0.38 | | |
| R16 = Aperture Stop | D16 = 0.51 | | |
| R17 = 7.706 | D17 = 0.16 | N9 = 1.846660 | ν9 = 23.9 |
| R18 = 2.276 | D18 = 0.66 | N10 = 1.516330 | ν10 = 64.1 |
| R19 = −6.557 | D19 = Variable | | |
| R20 = 3.339 | D20 = 0.62 | N11 = 1.696797 | ν11 = 55.5 |
| R21 = −2.138 | D21 = 0.16 | N12 = 1.834000 | ν12 = 37.2 |
| R22 = −8.824 | D22 = Variable | | |
| R23 = ∞ | D23 = 0.62 | N13 = 1.516330 | ν13 = 64.1 |
| R24 = ∞ | | | |

| | Focal Length | | |
|---|---|---|---|
| Variable Spacing | 1.00 | 7.48 | 17.80 |
| D5 | 0.13 | 3.50 | 4.14 |
| D13 | 4.28 | 0.91 | 0.27 |
| D19 | 1.94 | 0.71 | 2.42 |
| D22 | 0.57 | 1.81 | 0.09 |

* denotes an aspheric surface.
Aspheric Surface
R14 k=−3.59369e+00 B=3.72365e−03 C=−1.53095e−03 D=6.01276e−03 E=−8.20186e−03 F=3.34618e−03

(table 1)

TABLE 1

| Conditinal Expression | Numerical Example 1 | Numerica Example 2 | Numerical Example 3 |
|---|---|---|---|
| (1) | 0.074 | 0.075 | 0.060 |
| (2) | 0.436 | 0.426 | 0.383 |
| (3) | 0.295 | 0.298 | 0.255 |
| (4) | 0.817 | 0.956 | 0.891 |
| (5) | 0.595 | 0.490 | 0.570 |
| (6) | 1.48 | 2.27 | 1.73 |

Figure 13:
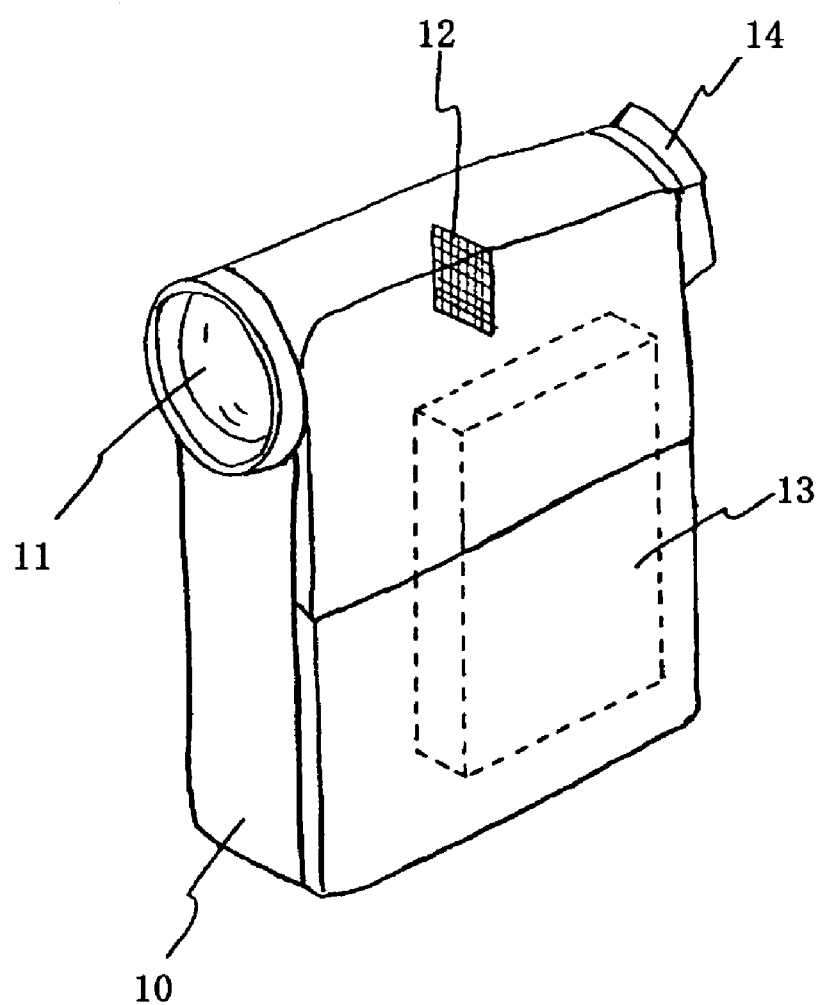
FIG. 13 is a schematic diagram showing main portions of a video camera.

Next, description is made for an embodiment of a video camera which uses the zoom lens of the present invention as an image-taking optical system with reference to FIG. 13.

In FIG. 13, reference numeral 10 shows a video camera body or a digital still camera body, 11 shows an image-taking optical system realized by the zoom lens of the present invention, 12 shows a solid-state image-pickup element (a photoelectrical conversion element) such as a CCD sensor or a CMOS sensor which receives an object image formed by the image-taking optical system 11, 13 shows a recording means for recording the object image received by the image-pickup element 12, and 14 shows a finder for observing an object image displayed on a display element, not shown. The display element is realized by a liquid crystal panel or the like, on which the object image formed on the image-pickup element 12 is displayed.

The zoom lens of the present invention can be applied to an image-taking apparatus such as a video camera to realize an image-taking apparatus which has a small size and excellent optical performance.

While preferred embodiments have been described, it is to be understood that modification and variation of the present invention may be made without departing from scope of the following claims.

What is claimed is:

1. A zoom lens system comprising in order from an object side to an image side:
   a first lens unit having a positive optical power;
   a second lens unit having a negative optical power;
   a third lens unit having a positive optical power, the third lens unit consisting, in order from the object side to the image side, of a first lens subunit having a positive optical power, an aperture stop, and a second lens subunit having one or more negative lens elements and one or more positive lens elements; and
   a fourth lens unit having a positive optical power,
   wherein the second lens unit and the fourth lens unit are moved during zooming, and
   the following condition is satisfied:

$0.05<|f2/ft|<0.081$ where ft represents a focal length of the entire system at a telephoto end, and f2 represents a focal length of the second lens unit.

2. The zoom lens system according to claim 1, wherein the second lens unit has an aspheric surface.

3. The zoom lens system according to claim 1, wherein the first lens subunit has a positive lens element including an aspheric surface, and the second lens subunit has a negative lens element having a concave surface on the image side and a positive lens element having convex surfaces on both sides.

4. The zoom lens system according to claim 1, wherein the fourth lens unit is moved to achieve focusing.

5. The zoom lens system according to claim 1, wherein the zoom lens system forms an image on a solid-state image-pickup element.

6. A zoom lens system comprising in order from an object side to an image side:
   a first lens unit having a positive optical power;
   a second lens unit having a negative optical power;
   a third lens unit having a positive optical power, the third lens unit consisting, in order from the object side to the image side, of a first lens subunit having a positive optical power, an aperture stop, and a second lens subunit having one or more negative lens elements and one or more positive lens elements; and
   a fourth lens unit having a positive optical power,
   wherein the second lens unit and the fourth lens unit are moved during zooming, and
   at least one of the following conditions is satisfied:

$0.34<|f1/ft|<0.57$ $0.22<|f2/fA|<0.34$ $0.74<f3/f4<1.2$ $0.48<|\beta 4t|<0.71$ where fw and ft represent focal lengths of the entire system at a wide angle end and a telephoto end, respectively, fi represents a focal length of an i-th lens unit, β4t represents an image-forming magnification of the fourth lens unit at the telephoto end, and fA is represented by:

$fA=\sqrt{fw \cdot ft}$.

7. The zoom lens system according to claim 6, wherein the second lens unit has an aspheric surface.

8. The zoom lens system according to claim 6, wherein the first lens subunit has a positive lens element including an aspheric surface, and the second lens subunit has a negative lens element having a concave surface on the image side and a positive lens element having convex surfaces on both sides.

9. The zoom lens system according to claim 6, wherein the fourth lens unit is moved to achieve focusing.

10. The zoom lens system according to claim 6, wherein the zoom lens system forms an image on a solid-state image-pickup element.

11. A zoom lens system comprising in order from an object side to an image side:

a first lens unit having a positive optical power;

a second lens unit having a negative optical power;

a third lens unit having a positive optical power, the third lens unit consisting, in order from the object side to the image side, of a first lens subunit having a positive optical power, an aperture stop, and a second lens subunit having one or more negative lens elements and one or more positive lens elements; and a fourth lens unit having a positive optical power, wherein the second lens unit and the fourth lens unit are moved during zooming, the second lens subunit has a convex surface closest to the image side, and the following condition is satisfied:

$$0.99<|R3bL/f3|<12.5$$

where R3bL represents a radius of curvature of the surface closest to the image side of the second lens subunit, and f3 represents a focal length of the third lens unit.

12. The zoom lens system according to claim 11, wherein the second lens unit has an aspheric surface.

13. The zoom lens system according to claim 11, wherein the first lens subunit has a positive lens element including an aspheric surface, and the second lens subunit has a negative lens element having a concave surface on the image side and a positive lens element having convex surfaces on both sides.

14. The zoom lens system according to claim 11, wherein the fourth lens unit is moved to achieve focusing.

15. The zoom lens system according to claim 11, wherein the zoom lens system forms an image on a solid-state image-pickup element.

16. A zoom lens system comprising in order from an object side to an image side:

a first lens unit having a positive optical power;

a second lens unit having a negative optical power, the second lens unit having three or more negative lens elements and one or more positive lens elements;

a third lens unit having a positive optical power, the third lens unit consisting, in order from the object side to the image side, of a first lens subunit having a positive optical power, an aperture stop, and a second lens subunit having one or more negative lens elements and one or more positive lens elements; and a fourth lens unit having a positive optical power, wherein the second lens unit and the fourth lens unit are moved during zooming.

17. The zoom lens system according to claim 16, wherein the following condition is satisfied:

$$0.05<|f2/ft|<0.081$$

where ft represents a focal length of the entire system at a telephoto end, and f2 represents a focal length of the second lens unit.

18. The zoom lens system according to claim 16, wherein at least one of the following conditions is satisfied:

$$0.34<f1/ft<0.57$$

$$0.22<|f2/fA|<0.34$$

$$0.74<f3/f4<1.2$$

$$0.48<|\beta 4t|<0.71$$

where fw and ft represent focal lengths of the entire system at a wide angle end and a telephoto end, respectively, fi represents a focal length of an i-th lens unit, $\beta 4t$ represents an image-forming magnification of the fourth lens unit at the telephoto end, and fA is represented by:

$$fA=\sqrt{fw \cdot ft}.$$

19. The zoom lens system according to claim 16, wherein the second lens subunit has a convex surface closest to the image side, and the following condition is satisfied:

$$0.99<|R3bL/f3|<12.5$$

where R3bL represents a radius of curvature of the surface closest to the image side of the second lens subunit, and f3 represents a focal length of the third lens unit.

20. The zoom lens system according to claim 16, wherein the second lens unit has an aspheric surface.

21. The zoom lens system according to claim 16, wherein the first lens subunit has a positive lens element including an aspheric surface, and the second lens subunit has a negative lens element having a concave surface on the image side and a positive lens element having convex surfaces on both sides.

22. The zoom lens system according to claim 16, wherein the fourth, lens unit is moved to achieve focusing.

23. The zoom lens system according to claim 16, wherein the zoom lens system forms an image on a solid-state image-pickup element.

24. A camera comprising:

the zoom lens system according to claim 1; and a solid-state image-pickup element which receives an image formed by the zoom lens.

25. A camera comprising:

the zoom lens system according to claim 6; and a solid-state image-pickup element which receives an image formed by the zoom lens.

26. A camera comprising:

the zoom lens system according to claim 11; and a solid-state image-pickup element which receives an image formed by the zoom lens.

27. A camera comprising:

the zoom lens system according to claim 16; and a solid-state image-pickup element which receives an image formed by the zoom lens.

* * * * *